TRUNK AND CONTROL CIRCUITS TO SEMI-AUTOMATIC MAGNETO EXCHANGE

Filed Oct. 28, 1952 4 Sheets-Sheet 1

INVENTOR.
WILLIAM A. LINDBLOOM
BY McWatters Owen
ATTY.

INVENTOR.
WILLIAM A. LINDBLOOM

BY [signature]

ATTY.

April 17, 1956 W. A. LINDBLOOM 2,742,529

TRUNK AND CONTROL CIRCUITS TO SEMI-AUTOMATIC MAGNETO EXCHANGE

Filed Oct. 28, 1952 4 Sheets-Sheet 3

INVENTOR.
WILLIAM A. LINDBLOOM

BY *[signature]*

ATTY.

TRUNK AND CONTROL CIRCUITS TO SEMI-AUTOMATIC MAGNETO EXCHANGE

Filed Oct. 28, 1952 4 Sheets-Sheet 4

INVENTOR.
WILLIAM A. LINDBLOOM
BY McWatters Owen
ATTY.

2,742,529

TRUNK AND CONTROL CIRCUITS TO SEMI-AUTOMATIC MAGNETO EXCHANGE

William A. Lindbloom, Franklin Park, Ill., assignor to Automatic Electric Laboratories, Inc., Chicago, Ill., a corporation of Delaware Application October 28, 1952, Serial No. 317,313

21 Claims. (Cl. 179—27)

Figure 4:
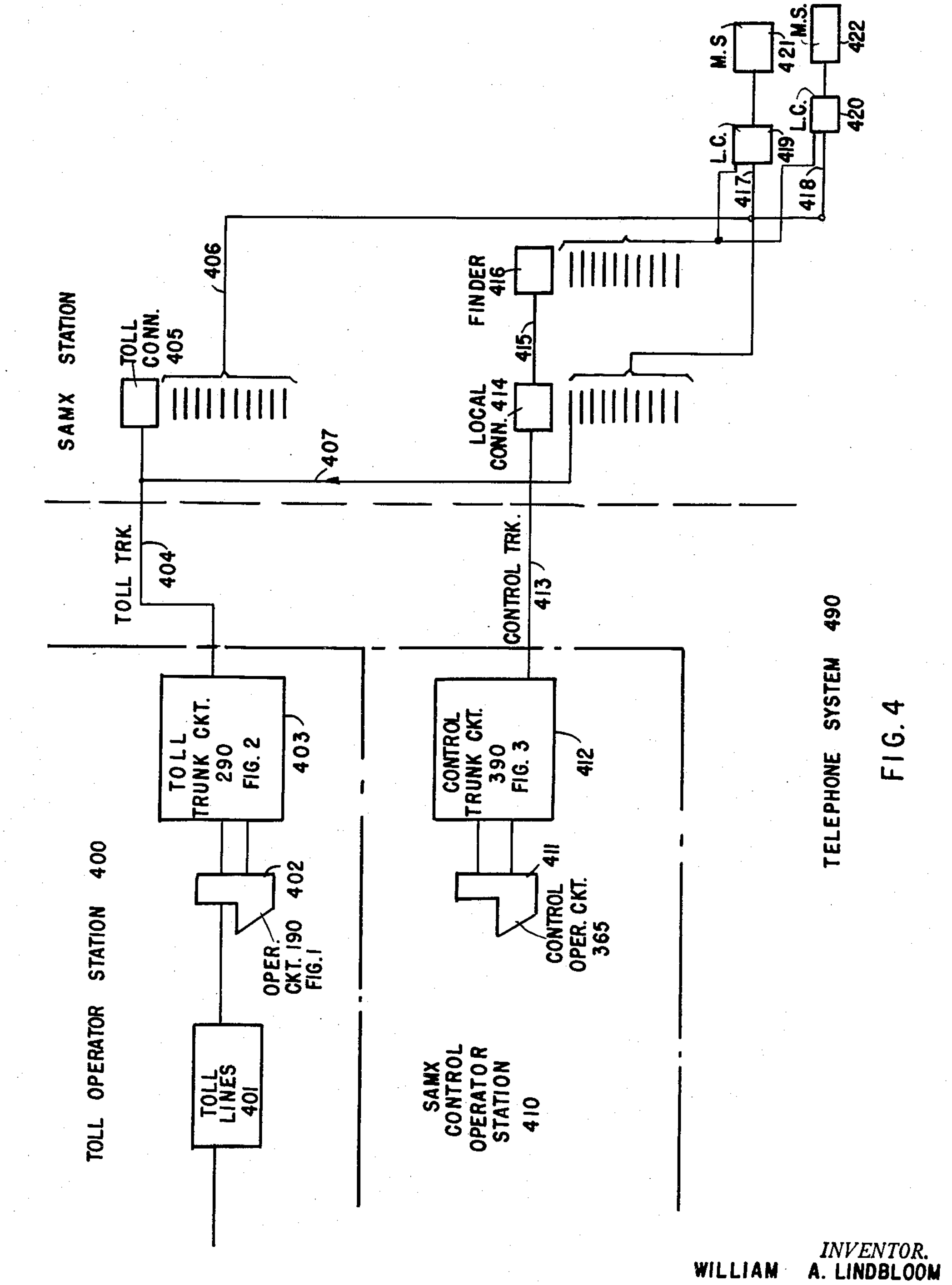

The present invention relates to telephone systems in general but is more particularly concerned with means for providing proper operator supervision for calls originating at semi-automatic magneto exchanges and terminating in toll exchanges; said means functioning in cooperation with digit sending equipment, such as keysenders, which require a low resistance ground circuit for proper operation thereof.

In a telephone system, a toll call incoming into the toll exchange is extended by the operator to the called party in the semi-automatic magneto exchange, S. A. M. X. This is accomplished by the operator by using a calling device to send digits corresponding to the number of the called S. A. M. X subscriber. The dialing operator monitors the call until it has been answered by the called party. No signal indicators are used to apprise the operator of an answered call. A signal indicator such as a supervisory lamp, however, is used to apprise the operator that a call has been terminated and that one or both of the parties have rung off. This supervisory lamp must remain dark so that when one of the conversing parties rings off upon termination of a call, the lamp will light up and give visual indication to the toll operator. To keep this lamp dark, a high resistance ground on the jack sleeve of the operator circuit is used in the supervisory lamp circuit.

When certain digit pulsing equipment is used in lieu of dialing equipment at the toll operator's position, a low resistance ground on the jack sleeve is a prerequisite for proper operation of the key sending equipment. Therefore it was necessary to have the low resistance ground on the jack sleeve until pulsing had been completed, after which, in accordance with the invention, the jack sleeve must be switched to high resistance ground in order to maintain a dark keyshelf during the established conversation. This invention was developed for use in conjunction with a keysender of the type described by H. W. Balzer in Patent No. 2,511,145 issued on June 13, 1950, or other types similar to it.

To perform this function automatically without extra key operations or extra keys and associated equipment, a special circuit was devised to cooperate in conjunction with the keysender operating circuit as well as with the supervisory lamp circuit. The aforementioned circuits, namely, the keysender operating circuit and the supervisory lamp circuit differ between themselves as to their individual battery resistances. The difference in battery resistance on the sleeve of the cord circuit with the talk key operated to one position, the Talk position, and the talk key operated to another position, the Monitor position, was utilized to effect a switching operation in the trunk.

The purpose of the invention is to achieve proper supervisory circuits possessing low and high resistance grounds, which do not interfere with the keysending control circuits also comprising high and low resistance circuits to control the digit sending equipment thereby allowing the latter to function properly.

The main object of the invention is to provide low and high resistance supervisory circuits working in conjunction with keysender operating circuits to operate the keysender and other related digit sending equipment.

Another object is to keep the supervisory signal inoperative during the digit sending operation.

A further object is to employ a single relay in dual capacity to effect control over its associated circuits involving A. C. and D. C. operations.

Another object is to condition the supervisory signal preparatory to ring-off by one of the conversing parties.

Figure 1:
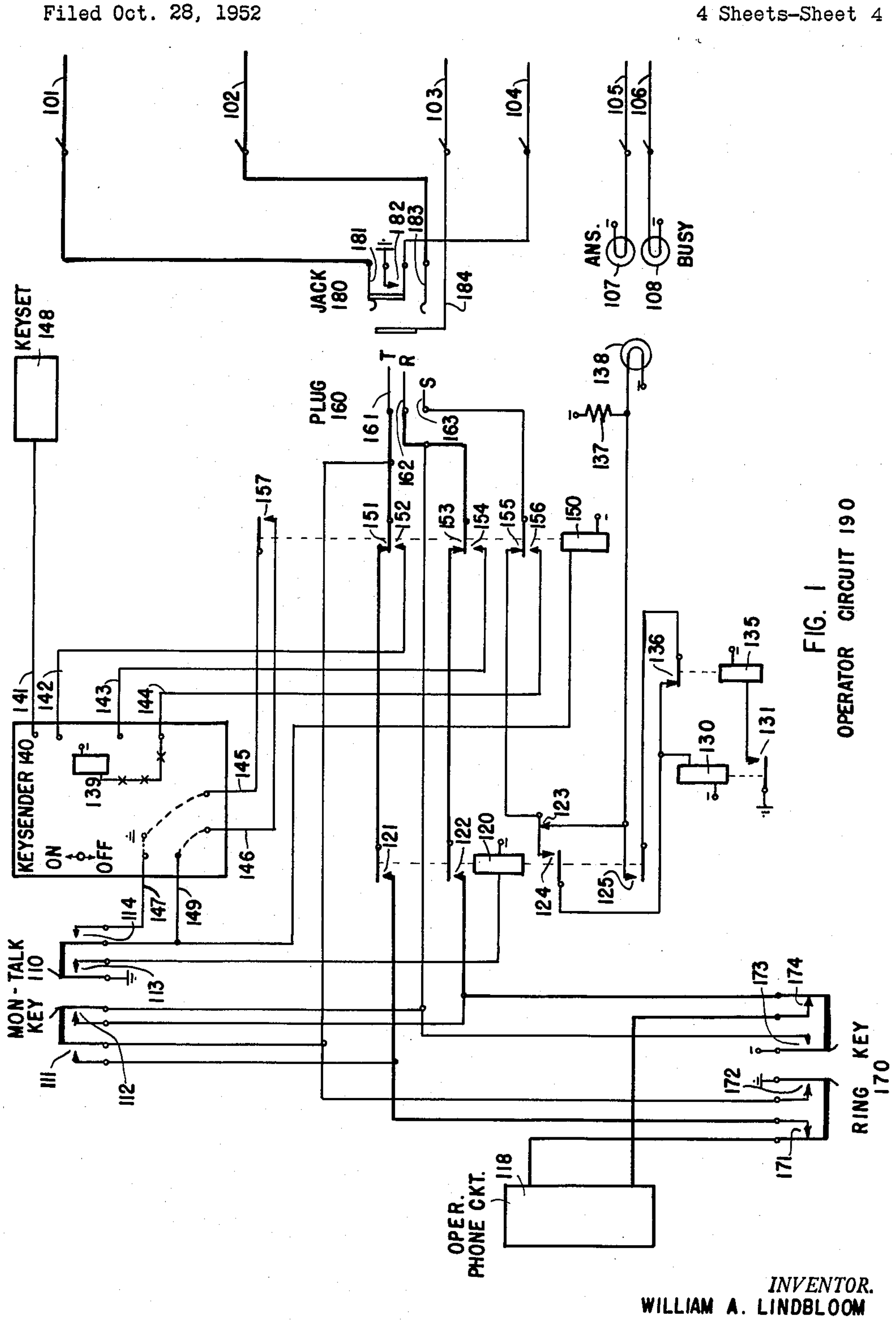

Figure 1 shows schematically the various circuits common to the toll operator position. Operator telephone circuit 118 is shown in block form as being connected to Mon-Talk key 110 through the ring key 170. Keysender 140 is also shown in block form but has incorporated therein a marginal relay 139 and simplified circuits indicated by broken lines.

Figure 2:
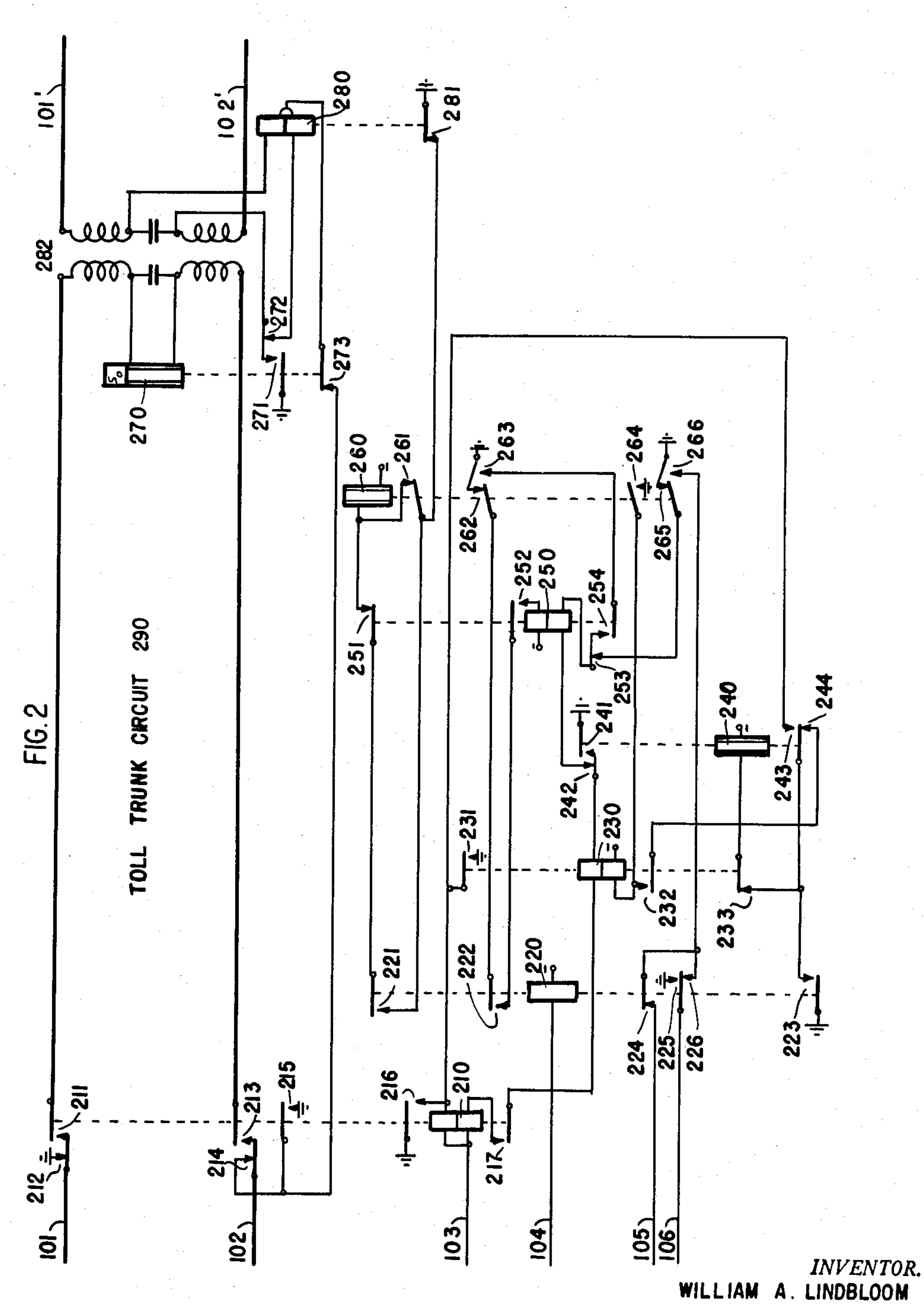

Figure 2 shows a toll trunk and the relays and circuits associated therewith.

Figure 3:
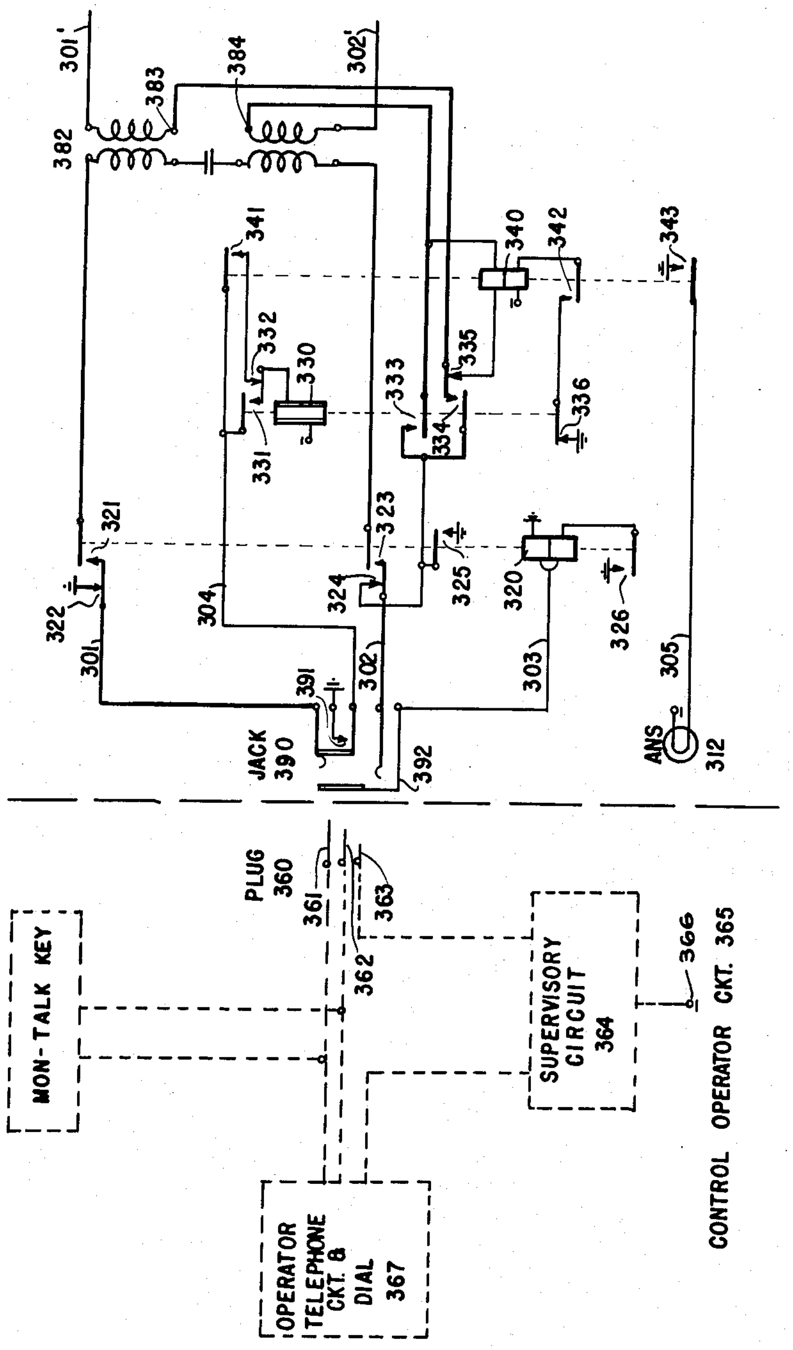

Figure 3 illustrates the control trunk with its associated relays and circuits. The control operator circuit 365 is briefly illustrated and shown connected by broken lines to the plug 360. The components used in this illustration are similar to those shown in detail in the operator's circuit 190 of Figure 1.

Figure 4 shows an overall layout of the telephone system in which the invention is used.

The supervisory lamp circuit consists of two parts: one part being located in the operator circuit 190 and the other part, known as the sleeve circuit, is located in the toll trunk circuit 290. Both parts of the supervisory circuit connect with each other via the sleeve of the plug-jack combination. The sleeve circuit used in this invention plays a dual role by also forming a part of the operating circuit for the keysender 140.

The toll operator may use the same end circuits and keysenders on all outgoing trunks extending to different locations, one of such trunks being a trunk going into a S. A. M. X. To enable the operator to use the cord circuit and keysender situated at the operator position on the S. A. M. X trunk without performing special operations, special circuit arrangements are provided in the S. A. M. X trunk, namely, the toll trunk circuit 290.

The supervisory lamp circuit comprises relays 130 and 135 together with the resistor 137 and the lamp 138. The supervisory lamp circuit connects through the sleeve of the plug-jack combination to the sleeve circuit comprised of relays 210, 230 and 250. With the Mon-Talk key 110 in Talk position and the plug 160 inserted into the jack 180, the keyshelf will be dark because cord circuit marginal relay 130 will have become operated and caused relay 135 to operate thereby opening the energizing circuit to the lamp 138. The operating circuit of relay 130 is from battery through the winding on relay 130, through the make contacts 124, through the break contacts 155 through the sleeves 163 and 184, through the lower winding on the sleeve relay 210, through the make contacts 217, through the upper (low resistance) winding on relay 230, and through the make contacts 241 to ground. The high resistance of the upper winding on the sleeve relay 210 prevents the cord circuit marginal relay 130 from operating until relay 210 operates first and establishes a low resistance ground circuit for the operation of relay 130 by closing its make contacts 217. The initial operating circuit for relay 210 extends from battery through both the resistor 137 and the lamp 138, through the make contacts 125, through the contacts 136, 124 and 155, through the sleeves 163 and 184, over line 103, through the upper winding on relay 210, through the make contacts 243 and 223 to ground. After relay 210 has operated, the holding circuit differs from the above operating circuit in that the current flows from battery through the winding on relay 130 instead of through the lamp 138 and resistor 137 (contacts 136 being open now), and mainly through the lower (low resistance) winding on relay 210 instead of exclusively through the upper (high resistance) winding of the same relay.

It is to be noted that the upper winding on relay 210 possesses high resistance and it is this high resistance which precludes the incipient operation of the keysender 140. To overcome this difficulty, an additional low resistance winding was placed on the sleeve relay 210 and incorporated in a novel low resistance circuit which would present a low resistance ground to the keysender for proper operation. This low resistance circuit consists of the lower winding on relay 210 and the upper winding on the control relay 230 and connected to ground at the make contacts 241 when the slow-release relay 240 is operated. This same low resistance circuit which allows the keysender to operate by presenting to it a low resistance ground, also forms part of the complete supervisory lamp circuit after the keysender has completed its function. It will be evident that after the keysender has terminated its operation and released the switching relay 150, the operator by having previously operated the Mon-Talk key 110 to either the Neutral or the Mon position has enabled the lamp 138 to be connected to the sleeves 163 and 184 via the break contacts 123 and 155; and thereafter through the lower (low resistance) winding on relay 210, through the make contacts 217, through the upper (low resistance) winding on relay 230, through the break contacts 242, through the lower (low resistance) winding on the sleeve circuit marginal relay 250, through the break contacts 253, and through the make contacts 265 to ground. As a result, relay 250 operates and locks itself thereby causing break contacts 253 to open the operating circuit, previously traced, to the lamp 138. This presents a dark keyshelf until one of the conversing parties rings off. Relay 250 also prepares for the ring-off operation by opening the break contacts 261 thereby opening one of the multiple holding circuits to relay 260 so that when the ring-off relay 280 operates upon receipt of ringing current initiated after the termination of a call, its break contacts 281 will be effective in releasing relay 260.

Key pulsing can be initated only after the operator inserts the plug into the jack leading to an outgoing trunk and has the cord circuit talk key operated to Talk position. Pressing down on any first digit button located on the keyset 148 will cause relay 150 to operate and lock itself up thereby preparing the keysender 140 to store the keyed digits. If the outgoing trunk is free, the keysender will function and transmit pulses corresponding to the keyed subscriber number. After each set of pulses representing a digit, a spacer interval occurs during which a testing function is performed by the "stop-dialing" circuit located within the keysender.

A brief description of the "stop-dialing" feature which is fully explained in the aforementioned Balzer patent is in order. Before the keysender begins to function and also at the end of sending of each digit, the control relays within the keysender check the outgoing trunk to see if a "stop-dialing" or "flash busy" condition exists on the trunk. The "stop-dialing" condition persists until an outgoing idle path is seized for receiving the next digit to be transmitted from the keysender, and therefore until an idle trunk is found. If a "stop-dialing" condition is encountered on the trunk the control relays stop the impulse sender in the keysender from sending any further digits by opening the lead connecting the keysender to the trunk, and by shunting the impulse springs of the impulse relay. If the "stop-dialing" condition still exists after a lapse of a certain interval of time, a sender pilot lamp flashes to signal the operator of the condition of the trunk. When the "stop-dialing" condition is removed or cleared up, the keysender will resume sending. The lead, a sleeve in this instance, is opened so as to present a high (open) resistance to the marginal relay 139 contained in the keysender. This causes the above relay to restore thereby preventing further transmission of pulses over the trunk.

Toll traffic to a distant S. A. M. X is completed in the following way: A call, coming over one of the toll lines, comes to the toll operator station 400 and is extended by the operator situated thereat through the operator circuit 190 contained in the cabinet 402; the connection is then extended to the toll trunk circuit 290, shown in block form 403, onto the trunk 404 to the toll connector 405, over one of the lines 406 and then through a line circuit such as 419 or 420 to the magneto subscriber such as 421 or 422. The toll operator rings the called line by operating the ring key at the toll operator station for each ring in accordance with the code signal assigned to the called subscriber. The aforementioned briefly described operation will now be presented in detail in that part which constitutes the invention and which entails the use of Figures 1, 2 and 4.

*Toll call to S. A. M. X station*

*Seizure*.—When a toll call comes in over one of the toll lines 401 into the toll operator station 400, the operator completes the call to the S. A. M. X subscriber, such as 421, by inserting plug 160 into the jack 180; and by operating the Mon-Talk key 110 to Talk position. When the Mon-Talk key 110 is operated to Talk position make contacts 113 close an operating circuit to relay 120. Make contacts 121 and 122 connect the operator's telephone circuit 118 to the tip 161 and ring 162 of the plug 160 by way of the break contacts 151 and 153, respectively. Make contact 114 prepares a series circuit to the switching relay 150 which allows the relay to become operated after the first key in the keyset 148 is operated. The keysender 140, which is connected to the keyset 148 by way of line 141, is shown as a block containing therein a simplified schematic revealing only sufficient components to aid in presentation of the invention contained herein and its method of operation as related to the whole system. For detailed operation and circuit disclosure of the keysender, see the Balzer Patent 2,511,145 issued on June 13, 1950. Lines 146 and 147 form part of a lock circuit in conjunction with make contacts 157 so that once the keysender 140 is operated, it will remain functioning even though make contacts 114 are opened thereafter by releasing the Mon-Talk key 110 from its Talk position. Make contacts 124 establish a partial operating circuit for the cord circuit marginal relay 130 and make contacts 125 extend the circuit to the supervisory lamp 138 via the break contacts 136. Keying of the first digit by the operator on the keyset 148 results in operation of relay 150. Energization of relay 150 results in transfer of the line 101 and 102 from the operator's telephone circuit 118 to the keysender circuit lines 142 and 143, respectively, when the make contacts 152 and 154 close. Make contacts 156 complete a circuit to a marginal relay 139 shown within the key sender 140. This marginal relay, as previously explained, will not operate if a high resistance ground due to the lack of an available free trunk or due to the use of a high resistance relay necessary for a dark keyshelf in a supervisory circuit, is found on the sleeve 163 and therefore the keysender 140 will not function even though the Mon-Talk key 110 is in Talk position and the plug 160 is situated in jack 180.

When the plug 160 is inserted into jack 180, a path for current flow is established from ground through the make contacts 182 on the jack 180, over the line 104, and through the winding on relay 220 to battery. Relay 220 operates and closes its make contacts 221 thereby preparing an operating circuit to the already operated relay 260 which became energized prior to this time on a ring-off upon the termination of the last telephone call. Operation of relay 260 will be described hereinafter under the heading "Called party ring-off." All of the contacts operated by relay 260 are shown to be angularly displaced indicating that relay 260 will be in operated condition for further discussion unless otherwise noted. Make contacts 222 on relay 220 prepare a lock circuit for the sleeve circuit marginal relay 250. Make contacts 223 close a path from ground, through the break contacts 233 on the control relay 230, and through the winding on the slow-to-release relay 240 to battery thereby operating relay 240. Make contacts 225 on relay 220 close a circuit to the busy lamp 108 causing it to light up.

Relay 240 operates and closes the make contacts 241 thus preparing a partial circuit to the upper winding on relay 230. Break contacts 242 open further the incomplete circuit to the lower winding on relay 250. Make contacts 243 close and complete a circuit from ground through the make contacts 223, through the make contacts 243, through the upper (high resistance) winding on the sleeve relay 210, over the line 103, through the sleeve 184 of the jack 180, through the sleeve 163 of the plug 160, through the break contacts 155, through the make contacts 124, and then through the parallel paths; through the winding on relay 130 to battery and also through the break contacts 136 and the make contacts 125 to battery via the resistor 137 and the supervisory lamp 138.

The cord circuit marginal relay 130, possessing a high resistance winding, does not operate at this time because the high resistance ground through the upper (high resistance) winding on the sleeve relay 210 limits the amount of current flow to such a low magnitude as to cause relay 130 to remain inoperative. The supervisory lamp 138 does not light up at this time because it also is affected by the high resistance ground in the afore-mentioned circuit.

Relay 210 operates due to energization of its upper winding and extends the line 101 and 102 further when the make contacts 211 and 213, respectively, close. Break contacts 212 open thus removing ground from line 101 and the break contacts 214 open to prevent grounding of conductor 102 at contacts 215. Make contacts 215 close and connect ground through the break contacts 273 to the two windings on the differential or ring-off relay 280. As a result, ground is applied through the upper winding on relay 280 and the upper right hand winding of repeating coil 282 to the line 101′ and through the lower winding on same relay, the break contacts 272 and the lower right hand winding of repeating coil 282 to the line 102′. Briefly, relay 210 by the above enumerated contacts simplexes the trunk to ground through the windings on the differential relay 280 and over the trunk conductors 101′ and 102′ to the toll connector 405, similar to the toll connector shown in the Peterson Patent 2,010,372, issued on August 6, 1935. The two windings on the differential relay 280 are so wound that the currents flowing through them in the aforementioned circuit create oppositely directed magnetic fields which cancel themselves thereby resulting in no operation of the relay 280 itself.

Relay 210 establishes a new ground when the make contacts 216 close to replace the ground at contacts 223. Make contacts 217 close and complete a circuit to the upper winding on relay 230 over the following path: ground through the make contacts 241 on relay 240, through the upper (low resistance) winding on relay 230, through the make contacts 217, through the lower (low resistance) winding on relay 210, out over the line 103, over the sleeve 184 of the jack 180, over the sleeve 163 of the plug 160, through the break contacts 155, through the make contacts 124, and through the high resistance winding on relay 130 to ground.

Relay 130 operates at this time and closes its contacts 131 to complete an operating circuit to relay 135. Relay 135 operates subsequently to open its break contacts 136 to open the energizing circuit to the supervisory lamp 138 via the make contacts 125. As a result, the lamp 138 remains inoperative thereby presenting a dark keyshelf. Relay 230 does not operate at this time because the high resistance of the winding on relay 130 in the previously traced circuit limits the flow of current below the magnitude required for operation of said relay.

*Keying.*—The operator depresses the digit keys on the keyset 148 in accordance with the requested subscriber number thereby conditioning the keysender 140 for digit pulse transmission.

Depressing the first key will cause the keysender 140 to close internally a path so that current will flow from the battery through the winding on relay 150, through the make contacts 114, over the line 147, through an internal circuit within the keysender 140 (shown by broken line) to ground thereby operating the switching relay 150. Thereafter a lock circuit is established for the relay 150 from battery through the winding on relay 150, over lines 149 and 146, through the make contacts 157 and over line 145 to ground within the keysender 140 thereby making the keysender 140 independent of the position of the Mon-Talk key 110.

When the make contacts 156 close, a circuit is established from battery through the winding on the marginal relay 139 in the keysender 140, through an internal circuit therein indicated by broken line, over line 144, through the make contacts 156, over the sleeve 163 and then through the low resistance sleeve circuit comprised of the following: sleeve 184, over the line 103, through the lower (low resistance) winding on the sleeve relay 210, through the make contacts 217, through the upper (low resistance) winding on the control relay 230, and through the make contacts 241 to ground. One of the purposes of relay 150 is to switch, by means of one of its armatures, the sleeve circuit from its connection to the supervisory lamp circuit to that of the keysender 140 operating circuit by opening contacts 155 and closing the contacts 156.

The "stop dialing" feature of the keysender tests the sleeve for presence of low resistance ground and if satisfactory, the marginal relay 139 in the keysender 140 operates and the keysender 140 begins to send out pulses corresponding to the first digit which was keyed. After each digit, a spacer interval occurs during which the sleeve is tested again for low ground prior to transmitting of the next series of pulses corresponding to the next keyed digit. The sleeve circuit is internally opened by the spacer relay in the keysender (not shown), as described in the Balzer Patent 2,511,145, during the pulsing periods so that relay 210 restores. During the spacer periods, the sleeve circuit is reclosed as will be described hereinafter, so that the sleeve relay 210 becomes reoperated.

The keysender 140 will begin to pulse after its marginal relay 139 will have become operated because of presence of low resistance ground found in the sleeve circuit as previously described, and the subsequent opening of the sleeve circuit by the spacer relay (not shown) within the keysender 140. The latter relay is also responsible for reclosing the sleeve circuit during the spacer interval so that the sleeve relay 210 can reoperate and prepare the sleeve circuit for the subsequent test for low resistance ground by the "stop dialing" feature of the keysender 140.

During pulsing, and with relay 210 restored as a result of the keysender opening the sleeve circuit, ground is extended through the break contacts 212 over the line 101, through the tip of the jack 180 and plug 160 combination, through the make contacts 152, over line 142, through the pulsing contacts (not shown here, but described in the Balzer Patent 2,511,145) within the keysender 140, out over the line 143, through the make contacts 154, out over the ring of the jack and plug combination 160 and 180, respectively, onto the line 102, through the break contacts 214, through the break contacts 273, to both windings on the differential relay 280, through the upper winding to line 101′ via the upper right winding of the repeating coil 282, and through the lower winding and the break contacts 272 to the line 102′ via the lower right winding of the repeating coil 282. During the period of pulsation, the simplex ground described above is opened and closed, thereby resulting in stepping of the S. A. M. X connector 405, such as is described in the Peterson Patent 2,010,372, to the called line terminal in the well known manner.

When the pulsing representing a digit has been completed, a spacer interval occurs before the next digit is pulsed. During the spacer period, the spacer relay (not shown) within the keysender operates, as previously described, and connects the sleeve circuit to the operating circuit within the keysender 140. This results in a completed operating circuit to relay 210 causing it to operate. As a result, a low resistance ground sleeve circuit is established through the lower (low resistance) winding on relay 210. Thereafter, the sleeve is tested by the keysender for a low resistance ground, and if present, will operate the keysender marginal relay 139 which upon operation will condition the keysender 140 to begin transmitting pulses corresponding to the next digit as soon as the sleeve circuit is opened thereafter in the manner previously described.

After the series of pulses corresponding to the last keyed digit have been transmitted by the keysender 140, the switching relay 150 is released automatically thereby disconnecting the keysender 140 from the toll trunk circuit 290 and reconnecting the talking lines 101 and 102, by means of the closure of contacts 151 and 153, to the operator telephone circuit 118 by way of the make contacts 121 and 122 and the break contacts 171 and 174, respectively.

Contacts 155 reclose and reconnect the sleeve circuit to the supervisory circuit so that a completed circuit may be traced from ground through the make contacts 223, through the make contacts 243, through the upper (high resistance) winding on the sleeve relay 210, over the line 103, through the sleeves of the jack and plug combination 180 and 160, respectively, through the break contacts 155, through the make contacts 124, through the break contacts 136, through the make contacts 125, and through the parallel combination of the resistor 137 and the lamp 138 to battery. It is to be noted that a multiple path exists for current flow through the winding on the cord circuit marginal relay 130, but this current is insufficient to energize this relay. The current flowing through the lamp 138 is also insufficient to cause its illumination. This insufficiency of current in the afore-traced circuit is due to the high resistance found in the upper winding on the sleeve relay 210 which is the reasons for the high resistance ground.

After relay 210 has operated and connected a low resistance ground circuit, which includes the lower (low resistance) winding on the above relay, to the sleeve, the circuit may be easily traced from ground through the make contacts 241, through the upper (low resistance) winding on the control relay 230, through the make contacts 217, through the lower (low resistance) winding on relay 210, over the line 103, over the sleeve of the jack and plug combination 180 and 160, respectively, through the break contacts 155 through the make contacts 124, and through the winding (high resistance) on the cord circuit marginal relay 130 to battery. Although a multiple circuit exists at the winding on relay 130, that is, the supervisory lamp circuit, the lamp 138 is precluded from operation because of energization of relay 130 which is responsible for closing the operating circuit by means of its make contacts 131, to the relay 135 which in turn opens the supervisory circuit by means of its break contacts 136. It is to be noted that relay 130 has operated at this time because of the low resistance ground found on the sleeve. As a result of operation of relay 130 and its control over the supervisory lamp circuit, the lamp 138 remains unlit thereby presenting a dark keyshelf.

Although the upper (low resistance) winding on relay 230 is included in the above traced circuit, the relay will not operate because of the presence of the high resistance in said traced circuit due to the winding on the relay 130.

*Ringing.*—A ringing signal is transmitted by the toll operator to the called S. A. M. X subscriber by operating the ring key 170. Operation of the ring key 170 by the toll operator closes a circuit to relay 270 from ground through the make contacts 172 on the ring key 170, through the tip of the plug and jack combination 160 and 180, respectively, over line 101, through the make contacts 211, through the upper left hand winding of the repeating coil 282, through the winding on the ringing relay 270, through the lower left hand winding of the repeating coil 282, through the make contacts 213, over the line 102, through the ring of the jack and plug combination 180 and 160, respectively, and through the make contacts 173 to battery which causes the ringing relay 270 to operate. Relay 270 possesses slow-to-operate characteristics so that it will not respond to spurious signals which may occur on either of the lines connected to the repeating coil 282; also it will not respond to A. C. ringing signals coming into the toll trunk circuit 290 over the lines 101′ and 102′.

Contacts 271 close and place ground on the ring lead 102′; break contacts 272 open the circuit from the lower winding on relay 280 to the lead 102′; and the break contacts 273 open to remove ground, established at the make contacts 215, which is applied to the tip lead 101′ by way of the upper winding on relay 280. The operation of relay 270 causes relay 280 to be circuit-wise disconnected and rendered inoperative during the operation and at the same time only one lead, the ring lead 102′ is grounded. The grounding of the ring lead 102′ completes a circuit to a differential relay (not shown) in the distant connector 405 causing the relay to operate and apply ringing current to the called line as described in the previously mentioned Peterson patent. Releasing the ring key 170 restores the relay 270 to stop the ringing and to operatively reconnect relay 280 to its former circuit. Manual operation of the ring key 170 enables the toll operator to code-signal any one of a large number of subscribers.

*Supervision.*—The supervisory circuit is closed from the jack sleeve 184 through the lower (low resistance) winding on relay 210 through the make contacts 217, through the upper (low resistance) winding on relay 230, and through make contacts 241 to ground. As was previously described under "Keying," relay 230 remained inoperated because the presence of the high resistance winding on relay 130 in the supervisory circuit limited the current flowing in the circuit below the normal operating current required for satisfactory pick-up of the armature on relay 230. Also, relay 130 is responsible for keeping a dark keyshelf as a result of completing an operating circuit to relay 135 which in turn opened the operating circuit to the lamp 138. It is to be remembered that during the present description of the operation, the Mon-Talk key 110 has been in the Talk position. The key in this position is responsible for the operation of relay 120, the latter being instrumental in switching relay 130 into the supervisory circuit thereby resulting in a dark keyshelf.

When the called party answers, the toll operator flips the Mon-Talk key 110 from the Talk position into the Mon position. Release of the key 110 from the Talk position causes the make contacts 113 to open up the operating circuit to relay 120. Restoration of relay 120 causes the make contacts 124 to open the operating circuit to relay 130. Closure of the break contacts 123 reconnected the lamp cord circuit to the sleeve circuit in an obvious manner.

As a result of removal of relay 130 from the supervisory circuit now contained entirely in the cord lamp circuit, the sleeve circuit can now be extended through additional relays possessing low resistance windings. Removal of the high resistance, namely relay 130, from the combined supervisory-sleeve circuit, allows relay 230 to become operated by increased current flowing from the battery through the parallel combination of the resistor 137 and the lamp 138, through the break contacts 123, through the break contacts 155, through the sleeves 163 and 184 of the plug and jack combination 160 and 180, respectively, over the line 103, through the lower (low resistance) winding on relay 210, through the make contacts 217, through the upper (low resistance) winding on relay 230 and through the make contacts 241 to ground.

Relay 230 becomes energized by the increased current flow from the battery through the parallel combination of the resistor 137 and the lamp 138, as previously brought out. Break contacts 233 open the operating circuit to slow-release relay 240 which after a short interval of time restores. Relay 230 then effects a lock circuit from the battery through its lower winding, through its make contacts 232, through the break contacts 244, and through the make contacts 223 to ground. Make contacts 231 establish a new source of ground for the upper winding on relay 210. When relay 240 released, its make contacts 241 opened and removed ground at the contacts 241 from the upper winding on relay 230, but its break contacts 242 made and established a new ground path from the upper winding on relay 230 by way of the lower (low resistance) winding on relay 250, through the break contacts 253, and through the make contacts 265 on relay 260.

This results in the energization of relay 250 the operation of which effects a lock circuit from the battery through its upper (operating) winding, through its make contacts 252, through the make contacts 222, and through the make contacts 262 to ground. The break contacts 251 open one of the multiple holding circuits to relay 260. Make contacts 253 open and remove ground from the lower winding on relay 250 thus effectively opening the low resistance ground circuit to the sleeve and the lamp circuit containing the lamp 138. Briefly the lamp circuit connects to the sleeve 184 and thereafter over line 103 to the multiple path existing at relay 210 which has a low and a high resistance winding connected in common at one point. The low resistance ground circuit passing through the lower (low resistance) winding on relay 210 also includes the low resistance windings on relay 230 (upper) and on relay 250 (lower). At this time, however, the low resistance ground circuit is open at the contacts 253 and 263. Relays 230 and 250 remain operated because of their individually established lock circuits. The other circuit passing through the upper (high resistance) winding on relay 210 terminates in ground at the contacts 231. Although the above circuit completes a path to the lamp circuit, the lamp 138 will not light up because of the presence of the high resistance of the upper winding on relay 210 in the completed circuit.

*Called party ring-off.*—When the called party rings-off, relay 280 becomes operated by alternating ringing current flowing from the connector 405 as explained in the previously mentioned Peterson patent, that is, when the called subscriber at the magneto station, such as 421, operates the magneto located thereat for ring-off, an alternating current relay (not shown) in the connector 405 causes a ringing generator to be connected to the line conductor 101′ and send an alternating ringing current thereover through the upper right hand winding of the repeating coil 282, through the serially connected windings on relay 280, through the break contacts 272, through the lower right hand winding of the repeating coil 282, over conductor 102′ and back to the ringing generator return circuit in the connector 405.

Relay 280 operates momentarily and opens its break contacts 281 which in turn open the holding circuit of relay 260. Relay 260 releases. The make contacts 261 open additionally the already opened holding circuit to relay 260. The make contacts 262 open and break the holding circuit to relay 250. Break contacts 263 make and establish ground, allowing a low resistance circuit to be completed from that point through the make contacts 254, through the lower winding (low resistance) on relay 250, the break contacts 242, through the upper winding (low resistance) on relay 230, through the make contacts 217 through the lower winding (low resistance) on relay 210, over the line 103, through the sleeves 184 and 163, through the break contacts 155, through the break contacts 123, and through the parallel network of the resistor 137 and the lamp 138 to battery. As a result of this low resistance circuit, the supervisory lamp 138 lights up and relay 250 is continued held operated although its lock circuit has been previously opened. Break contacts 264 close a multiple holding circuit for relay 230. Break contacts 266 close and apply ground to the incomplete circuits leading to both the answer lamp 107 and the busy lamp 108, operation of which will be later described for a call coming from a magneto subscriber 421 over the communication circuit terminating in the toll operator station 400.

When the toll operator challenges the disconnect signal by operating the Mon-Talk key 110 to the Talk position, relay 120 operates and through its contacts completes an operating circuit to relay 130 from battery through the (high resistance) winding on relay 130, through the make contacts 124, through the break contacts 155, over the sleeves 163 and 184, over the line 103, through the lower (low resistance) winding on relay 210, through the make contacts 217, through the upper (low resistance) winding on relay 230, through the break contacts 242, through the lower (low resistance) winding on relay 250, through the make contacts 254, and through the break contacts 263 to ground.

Operation of relay 130 closes the operating circuit to relay 135 via the make contacts 131. Operation of relay 135 in turn causes the break contacts 136 to open the energizing circuit to the lamp 138 thereby extinguishing it.

After the operating circuit has been established for relay 130 over the path first described and which includes the lower winding of relay 250, relay 250 will restore becase the high resistance of the winding on relay 130 limits the current to a value below the magnitude required to hold relay 250 operated. Relay 130 will remain operated even though the break contacts 263 open and remove ground because a new ground will be established upon closure of the make contacts 265 when relay 260 becomes operated as hereinafter explained. Upon restoration of relay 250, its break contacts close and complete an operating circuit to relay 260 from battery through the winding on relay 260, through the break contacts 251, through the make contacts 221, and through the break contacts 281 to ground. Make contacts 252 further open the incomplete lock circuit to relay 250.

Relay 260 operates and effects a lock circuit via its make contacts 261. Make contacts 262 establish a ground for the incomplete lock circuit to relay 250 over an obvious path. Break contacts 263 remove ground from an incomplete circuit leading to the lower winding on relay 250 and the break contacts 264 remove ground from one of the multiple hold circuits for relay 230. Make contacts 265 establish a new ground for the operating circuit of relay 130 so that newly substituted circuit continues from the lower winding on relay 250, through the break contacts 253, and through the make contacts 265 to ground. Opening of contacts 266 remove ground from incomplete circuits containing the answer lamp 107 and the busy lamp 108.

*Release.*—When the toll operator disconnects by pulling the plug 160 out from the jack 180, all operated relays in the toll trunk circuit 290 such as 210, 220 and 230 will become released except that relay 260 will continue being operated because of its independent lock circuit. The busy lamp 108 is extinguished when the make contacts 225 are released upon deenergization of relay 220. Relays 130 and 135 become released in the operator circuit 190. Relay 120 becomes released when the toll operator flips the Mon-Talk key 110 back to the Neutral position. The distant switch train connecting the magneto subscriber 421 to the toll trunk circuit 403 also releases. The circuit is now normal.

Up to the present time, operation was described for key-sending involving a S. A. M. X substation and a toll operator station. Now a similar operation concerned with keying but which involves three stations, a S. A. M. X station, a control operator station, and a distant toll operator station will be presented. Figs. 1, 2, 3 and 4 will enter into this presentation.

*S. A. M. X station call to distant (toll) station*

*Seizure.*—Whenever a call is initiated by a magneto subscriber at a substation, such as substation 421, over the line circuit 419, and the line 417 which connects to the line finder 416, the line finder operates and finds the calling line and connects it over the line 415 through the local connector 414 and over the control trunk 413 to the control trunk circuit 390 as shown in block form 412 in Fig. 4. The control trunk 413 comprises lines 301' and 302'. An over all view of the connection of the magneto subscriber substation 421 to the S. A. M. X control operator station 410 is clearly shown in Fig. 4.

When the magneto subscriber rings over the lines 301' and 302', alternating current coming over the control trunk 413 operates relay 340 through its upper winding. Relay 340 will also operate if a D. C. voltage is impressed across the repeating coil 382. Relay 340 operates and effects a lock circuit from battery through its lower winding, through its make contacts 342 and through the break contacts 336 to ground. The make contacts 341 close and prepare an operating circuit to relay 330. Make contacts 343 close the circuit to the answer lamp 312 thus causing it to light up at the control operator position.

*Control operator answers.*—When the control operator answers by inserting the plug 360 into the jack 390, ground at the jack through the contacts 391 is impressed over the line 304, through the make contacts 341, through the break contacts 332 and through the winding on relay 330 to battery. Relay 330 becomes operated. Thereafter relay 330 effects a holding circuit through its make contacts 331. The make contacts 333 and 334 open the upper winding of relay 340 from the trunk, namely, from the terminals 383 and 384 of the repeating coil 382 and connect these terminals, 383 and 384, together, thereby preparing that side of the repeating coil 382 for transmission of signals. Break contacts 336 open the lock circuit to relay 340 thereby releasing it. Battery 366 at the control operator circuit 365 is extended to ground over the sleeves 363 and 392 of the plug 360 and the jack 390, and over the lead 303 to operate relay 320 through its upper winding. Make contacts 321 and 323 connect lines 301 and 302 to the repeating coil 382 in preparation for voice transmission. Break contacts 322 open and remove ground from line 301. Break contacts 324 open and disconnect line 302 from intermediatory connection to the right side of the repeating coil 382 via the make contacts 333 and 334. The make contacts 325 close and simplex the trunk through the make contacts 333 and 334 and through the repeating coil 382. As a result, ground is impressed over the trunk, comprising lines 301' and 302', which connects to a distant S. A. M. X equipment, such as the local connector 414, thereby preparing said equipment for dialing. Make contacts 326 complete the lock circuit, through the lower winding, to relay 320.

It should be noted here, that the control trunk circuit 390 cannot be seized by inserting the plug 360 into the jack 390 unless a call is received. This is due to the fact that relay 330 will not operate because its energizing circuit depends upon previous operation of relay 340, which is responsive to ringing current only, to close the make contacts 341.

*Control operator dials.*—The calling party tells the operator the number of the toll party desired and the operator dials back over the control trunk 413 into the local connector 414. When the dial (contained in the operator telephone circuit 367) is pulled off normal, battery is removed from the cord sleeve 363. Relay 320 releases and connects the ground, as will be described hereinafter, through the dial impulse springs (this being contained in the operator telephone circuit 367) to each side of the control trunk circuit 390. Contacts 321 and 323 open the line connection to the repeating coil 382 in preparation for pulsing. Contacts 325 open the simplex ground at that point also in preparation for digit pulse sending. As the dial returns to normal, simplex ground is opened and closed, and the distant S. A. M. X local connector 414 is stepped to the called line terminal level. The circuit during pulsing can be traced from ground at the break contacts 322, the line 301, through the tip of the jack 390, through the tip 301 of the plug 360 through the pulse springs of the dial required at the operator telephone circuit 365 back over the ring 362 of the plug 360, and the ring of the jack 390 over the line 302, through the break contacts 324, through both of the make contacts 333 and 334, to the center tap terminals 383 and 384 of the repeating coil 390 and thereover over control trunk 413 comprising the lines 301' and 302' to the local connector 414 and the battery located thereat. The local connector 414 is of the well known Strowger type and is adequately explained under similar circumstances in the Peterson patent.

Dialing of the first digit will step the local connector 414 to the level containing the row of terminals wherein is located the bank contacts terminating the line connecting to the trunk line 404. Dialing of the second digit by the control operator will cause the local connector 414 to move its wiper to the desired bank contact which connects with the toll trunk 404. After the dialing is completed, relay 320 reoperates and through its make contacts 321 and 323 connects the cord tip and the ring of the jack 390 to the repeating coil 382 for transmission of voice signals; and contacts 325 serially reconnect the two windings on the right side of the repeating coil 382 via the make contacts 333 and 334 in preparation for voice transmission.

*Ringing.*—After the local connector 414 establishes a connection between the control trunk 413 to the toll trunk 404 over the line 407, ringing is started automatically by the local connector 414. Ringing current is impressed across the toll trunk 404, which is comprised of lines 101' and 102', to the repeating coil 282. Relay 280 operates from the ringing current impressed across both of its windings over an obvious circuit. The break contacts 281 open and remove ground from the lock circuit of relay 260. Relay 260 releases and its break contacts 266 connect ground to the answer lamp 107 and the busy lamp 108 located at the toll operator's position thus lighting them up. Make contacts 261 open up the already opened lock circuit to relay 260. Make contacts 262 open an incomplete lock circuit to relay 250. Break contacts 263 establish ground to the incomplete circuit leading to the lower winding on relay 250. Break contacts 264 close and establish an operating circuit to relay 230 in an obvious manner causing it to operate. Contacts 265 open and remove ground leading to the lower winding on relay 250.

As a result of the operation of the relay 230, contacts 231 will close and prepare a ground for a circuit leading to the upper winding on relay 210. Make contacts 232 close and prepare a multiple operating circuit to relay 230 over the break contacts 244 and to ground upon the closure of the make contacts 223.

*Toll operator answers.*—When the operator answers by inserting the plug 160 into the jack 180, relay 210 becomes operated over the following circuit: battery through both the resistor 137 and the lamp 138 through the break contacts 123, through the break contacts 155, through the sleeve 163 of the plug 160, through the sleeve 184 of the jack 180, over the line 103, through the upper winding on relay 210, and through the make contacts 231 to ground. The make contacts 211 and 213 connect the line 101 and 102 to the repeating coil 282. The break contacts 212 open and remove ground from line 101. Break contacts 214 disconnect the line 102 from the circuit leading to relay 280. Break contacts 215 close and apply ground over contacts 273 and then through both windings on relay 280, over an obvious circuit to each winding of the repeating coil 282 thereby simplexing the trunk, namely the lines 101′ and 102′. Break contacts 216 establish a lock circuit for relay 210. Make contacts 217 prepare a circuit which will play a part in the lamp circuit. This will be described later.

Relay 220 will operate when the ground at the jack 180 is connected over the make contacts 182, over line 104, and through the winding on relay 220 to battery. Contacts 221 close and complete an operating circuit to relay 260 in an obvious manner. Contacts 222 close and prepare a lock circuit to relay 250. The make contacts 223 apply ground at that point through the break contacts 244, through the make contacts 232, and through the lower winding on relay 230 to battery. The answer lamp 107 becomes extinguished when contacts 224 open up. Make contacts 225 connect a new source of ground to the circuit containing the busy lamp 108 thereby keeping it further illuminated.

Relay 260 becomes operated when current flows from the battery through the winding on relay 260, through the break contacts 251 through the recently established contacts 221, and through the make contacts 281 to ground. Make contacts 261 establish a lock circuit for relay 260 in an obvious manner. Make contacts 262 prepare an obvious circuit to the locking winding on relay 250. Contacts 263 open an incomplete circuit to the lower winding on relay 250. Contacts 264 open and remove a source of ground to the operating circuit of relay 230 but said relay remains energized because of another multiple circuit. Contacts 265 prepare a circuit to the lower winding on relay 250. Contacts 266 open and remove the source of ground formerly used by the two circuits containing the lamps 107 and 108.

Since relay 260 has operated and thereby prepared to some extent several circuits to relay 250, the latter relay will operate from current flowing from a battery through the resistor 137 and the lamp 138 (causing it to light up), through the break contact 123, through the break contact 155, over the sleeves of the plug 160 and jack 180 combination, over the line 103, through the lower (low resistance) winding on relay 210, through the make contacts 217, through the upper (low resistance) winding on relay 230, through the break contacts 242, through the lower (low resistance) winding on relay 250, through the break contacts 253, and through the make contacts 265 to ground. Relay 250 establishes its lock circuit when its make contacts 252 close and establish ground through the make contacts 222 and 262. Break contacts 251 open a multiple operating circuit to relay 260. Make contacts 254 close to prepare a circuit for the low winding on relay 250. The break contacts 253 open the energizing circuit to the lower winding on relay 250 with the result that the supervisory lamp 138 becomes extinguished.

The operator is able to connect the operator telephone circuit 118 to the calling trunk 404 by operating the Mon-Talk key 110 to Mon position thereby connecting the operator telephone circuit 118 through the contacts 171 and 174 of the ring key 170, through the make contacts 111 and 112 of the Mon-Talk key 110, over the tip 161 and the ring 162 of the plug 160, over the tip 181 and the ring 182 of the jack 180, over the line 101 and 102, and through the make contacts 211 and 213 to the repeating coil 282. It is to be noted that the supervisory lamp 138 would also have become lit and subsequently extinguished had the Mon-Talk key 110 been in the Talk position instead of the Neutral position prior to the insertion of the plug 160 into the jack 180 by the operator upon the original challenge. The circuit in that case could have been traced from the battery through the resistor 137 and the lamp 138, through the make contacts 125, through the break contacts 136, through the make contacts 124, through the break contacts 155, over the sleeves of the plug-jack combination, over the line 103, through the upper winding on relay 210, and through the make contacts 231 to ground. The operation of the other relays in the toll trunk circuit 290, as hereinbefore enumerated, would have been identical. Relay 130 in either of the above traced circuits will not operate because of current limitation by the high resistance of the upper winding on relay 210. However, as soon as the circuit is established through the lower (low resistance) winding on relay 210, relay 130 would have operated, except at this point, relay 250 operates and opens the break contacts 253 thereby opening the sleeve circuit connecting to the supervisory circuit as indicated in the last paragraph.

The toll operator extends the call by connecting the calling line, in a manner well known, to one of the toll lines 401 shown at the toll operator position 400. The control operator disconnects from the established circuit by withdrawing the plug 360 from the jack 390 thereby freeing the control trunk circuit 390 and control trunk 413 and making it available for another call.

*Supervision.*—As has been pointed out in the last section, the supervisory lamp 138 becomes extinguished when the sleeve circuit, to which the lamp circuit was connected via the sleeve, became open circuited due to opening of the break contacts 253 when relay 250 became operated. The keyshelf remains dark throughout the period of the conversation ensuing between the subscribers. At this time, the following relays in the toll trunk circuit 290 remain operated: 210, 220, 230, 250 and 260.

*Called party ring-off.*—When the calling party rings off, the operation is similar to that described under "Toll call to S. A. M. X station—Called party ring-off—release."

While there has been described what is at present considered to be the preferred embodiment of the invention, it is to be understood that various modifications may be made thereof, and it is contemplated in the appended claims to cover all such modifications within the true spirit and scope of the invention.

What is claimed is:

1. In a telephone system, a plurality of substations, a toll operator station, a trunk means including a cord circuit for connecting said toll operator station to said trunk, a sleeve conductor in said cord circuit, a supervisory signal connected to said conductor, a manually operated device, a cord circuit marginal relay, control means associated with said connecting means, said control means comprising a circuit connecting low resistance ground to said sleeve conductor thereby forming a low resistance ground sleeve circuit, means operated responsive to an operation of said manually operated device and said connecting means for connecting said cord circuit marginal relay to said low resistance ground sleeve circuit, said cord circuit marginal relay operated in response to connection to said sleeve circuit, means responsive to the operation of said cord circuit marginal relay for disconnecting said signal from said sleeve circuit, digit pulsing means, means for connecting said pulsing means to said low resistance sleeve circuit, said pulsing means operated in response to connection to the low resistance sleeve circuit for sending digit pulses over said trunk, said pulse connecting means also operated for releasing said cord circuit marginal relay and keeping said signal disconnected from said sleeve conductor, a sleeve circuit marginal relay connectable to said sleeve circuit, said pulse connecting means released in response to the completion of operation of said pulsing means for re-connecting said cord circuit marginal relay to said sleeve circuit, said cord circuit marginal relay being effective to prevent operation of said control means, said cord circuit marginal relay connecting means operated responsive to a second operation of said manually operated device for releasing said cord circuit marginal relay and reconnecting said signal to said sleeve circuit after the termination of pulse transmission, said control means operated in response to release of said cord circuit marginal relay, said sleeve circuit marginal relay operated in response to said operation of said control means for breaking said sleeve circuit and preparing same for ring-off operation of said signal upon termination of the call.

2. In a telephone system as claimed in claim 1, means for initiating ring-off operation, said ring-off initiating means operated in response to a signal from one of the conversing subscribers, means controlled by the operation of said ring-off means for maintaining said sleeve marginal relay operated completing the circuit through said sleeve marginal relay to said signal thereby effecting supervision.

3. A telephone system comprising a toll trunk, a plurality of magneto subscribers, a cord circuit having a sleeve, a signal in said cord circuit connected to said sleeve, means for connecting said cord circuit to said trunk, a key, a marginal relay, control means, said control means connected to said sleeve thereby forming a low resistance ground sleeve circuit, said control means remaining unoperated during the connection of said cord circuit to said trunk, means operated responsive to an operation of said key for connecting said marginal relay to said low resistance sleeve means operated responsive to connection of said marginal relay to said low resistance ground sleeve circuit for disconnecting said signal, a second marginal relay, said marginal relay connecting means operated responsive to a further operation of said key for disconnecting said first marginal relay and reconnecting said signal to said sleeve, said control means operated in response to said reconnection of said signal for connecting said second marginal relay to said sleeve circuit, said second marginal relay operated in response to its connection to said sleeve circuit for preparing said signal for ring-off upon the termination of the call established over said toll trunk to any one of said magneto subscribers.

4. A telephone system as claimed in claim 3 including ring-off means, means effective in response to receipt of a disconnect signal from one of said subscribers for operating said ring-off means, said second marginal relay effective in conjunction with said ring-off means for completing a circuit to said signal whereby the toll operator is apprised of the termination of the call.

5. A telephone system comprising a toll trunk, an operator's circuit, a plurality of subscribers, a cord circuit having a sleeve, means including said cord circuit for connecting said operator's circuit to said toll trunk, a supervisory signal connected to said sleeve, means for extending a call from said toll trunk to any one of said subscribers, a marginal relay, a manually operated device, means operated in response to actuation of said device for connecting said marginal relay to said sleeve, said marginal relay operated in response to said sleeve connection, means operated responsive to the operation of said marginal relay for disconnecting said signal from said sleeve, means for sending keyed digit pulses, means in said cord circuit for connecting said digit sending means to said toll trunk and for temporarily disconnecting said marginal relay therefrom, a low resistance ground circuit connected to said cord circuit via said sleeve, said digit sending means effective in response to connection of said low resistance ground circuit on said sleeve for transmitting digit pulses, a second marginal relay, a control means, said control means effective upon termination of pulse transmission in response to further actuation of said device for connecting said second marginal relay to said sleeve circuit, said second marginal relay operated in response to such connection for disabling said signal and for preparing said signal for operation by a disconnect signal, and means for maintaining the supervisory signal disabled during the conversation period of the established call, whereby the signal may be energized in response to the receipt of said disconnect signal to alert the operator of the terminated call.

6. A telephone system as claimed in claim 5 wherein said disconnect signal comprises ringing current transmitted by said called subscriber, ring-off means operated in response to receipt of said ringing current for maintaining said second marginal relay operated, said supervisory signal effective in response to the maintenance of said second marginal relay and to the operation of said ring-off means for signalling the toll operator of a terminated call.

7. A telephone system comprising a toll trunk, a plurality of subscribers, means for connecting said toll trunk to any one of said subscribers, a cord circuit including a sleeve, a signal in said cord circuit, means for connecting said cord circuit to said trunk, a manually operated key, a cord circuit marginal relay, means operated in response to actuation of said key for connecting said marginal relay to said sleeve, a low resistance ground sleeve circuit, means for operating said marginal relay responsive to its connection to said sleeve circuit, means controlled by the operation of said marginal relay for disconnecting said signal, a key sender operated for sending keyed pulses, a switching relay operated responsive to the initiation of the operation of said key sender for connecting and disconnecting said trunk and said low-resistance ground sleeve circuit to said key sender, means operated in response to the connection of said low resistance ground sleeve circuit to said sender to cause it to transmit the keyed digit pulses over said trunk, a sleeve marginal relay, a slow-release relay operated in response to the connection of said cord circuit to said trunk and released in response to release of said key sender upon the termination of said transmission of pulses, means including said key for releasing said slow-to-release relay upon termination of said pulses, contacts on said slow-release relay closed on release thereof for extending said sleeve circuit through said sleeve marginal relay, said sleeve marginal relay operated in response to said contacts closing for preparing said signal for operation.

8. A telephone system as claimed in claim 7 including ring-off means, said ring-off means operated in response to a disconnect signal received from one of said calling subscribers for energizing said sleeve circuit whereby the signal is energized to apprise the toll operator of a terminated call.

9. A telephone system comprising a toll trunk, a plurality of magneto subscribers, a toll operator's position, a cord circuit including means for connecting the same to said toll trunk, a key, a marginal relay and a supervisory circuit in said cord circuit, means including said marginal relay effective in response to operation of said connecting means and said key for disconnecting said signal from said cord circuit, digit pulsing means, simplex means in said trunk for simplexing the trunk for the transmission of digit pulses thereover, a low resistance ground sleeve circuit associated with said trunk, means for connecting said pulsing means to said trunk and to said low resistance ground sleeve circuit, means effective in response to connection of said pulsing means to said low resistance ground sleeve circuit for causing said pulsing means to send a series of pulses over said simplex trunk, a sleeve marginal relay, other means effective in response to termination of said pulse transmission for operating said sleeve marginal relay, means controlled by the operation of said sleeve marginal relay in response to operation of said other means for effecting control over said supervisory signal whereby said signal is prepared to operate in response to receipt of a ring-off signal upon the termination of the established call over said toll trunk to any of said subscribers.

10. A telephone system as claimed in claim 9, including ring-off means operated in response to the receipt of a ring-off signal transmitted by one of the conversing subscribers, said ring-off means completing the circuit to said supervisory signal through said sleeve marginal relay to energize said signal thereby informing the operator of the terminated call, said sleeve marginal relay and said supervisory signal released in response to disconnection of said cord circuit from said trunk.

11. A telephone system comprising a toll trunk terminating in a toll operator position, a control trunk terminating in a control operator's position, a plurality of semi-automatic magneto substations, means operated in response to initiation of a call from any one of said substations for connecting said calling substation to said control trunk and signalling the operator thereat, means operated in response to actuation by said control operator to extend said call to said toll position over said control and toll trunks, means effective in response to the extension of said call for sending ringing alternating current over said toll trunk, a first relay, a differential relay connected across said toll trunk, said differential relay operated in response to receipt of said alternating current for releasing said first relay, a call signal, said call signal effective in response to release of said first relay for signalling the operator at said toll station of the incoming call.

12. A telephone system as claimed in claim 11, including a supervisory signal at said toll operator's position, a circuit for linking said supervisory signal to said toll trunk, said differential relay reoperated in response to the receipt of a disconnect signal from the subscriber at said calling substation to again release said first relay, said last release of said first relay effective to complete said circuit to said supervisory signal thereby operating said supervisory signal to inform the toll operator of the terminated call.

13. A telephone system comprising a two-way toll trunk terminating in a toll trunk circuit, a control trunk terminating in a control trunk circuit, a plurality of semi-automatic magneto substations, a control operator's position, means for connecting any one of said substations to said control trunk and signalling the operator at said control station upon the initiation of a toll call from said calling substation, means controlled by said control operator for connecting said control trunk to said toll trunk and for sending alternating ringing current thereover, a multiple winding differential relay connected across said toll trunk, signalling means, said differential relay effective in response to the receipt of said alternating current on an incoming toll call from said calling substation for operating said signalling means to signal the operator at said toll position; a plurality of toll lines terminating in said toll operator position, a digit pulsing means, means for connecting said toll operator position to said toll trunk circuit to extend an outgoing toll connection from one of said toll lines to one of said substations, means for operating said digit pulsing means upon connection to said toll trunk circuit to produce a series of digit pulses, means to transmit said digit pulses through both of said multiple windings of said differential relay and over said toll trunk, said differential relay remaining unoperated during said pulses, means operated in response to the receipt of said pulses for extending said toll trunk to said called substation, means for sending a ringing signal, a ringing relay, said ringing relay effective in response to the receipt of the ringing signal for operatively removing said differential relay from said toll trunk and for unbalancing said toll trunk to ring the called subscriber.

14. A telephone system as claimed in claim 13, including a supervisory circuit at said toll operator's position, a marginal relay in said toll trunk circuit, means for connecting said supervisory circuit to said toll trunk circuit, said marginal relay operated in response to connection of said supervisory connecting means to said toll trunk circuit for preparing said supervisory circuit, said differential relay operated in response to the receipt of a disconnect signal from one of said substations, and means controlled by the operation of said differential relay for completing said supervisory circuit and to signal the toll operator of the terminated call.

15. A telephone system comprising a two-way toll trunk for establishing incoming and outgoing calls thereover, a differential relay having two windings, a simplex circuit including said windings, an operator station, a plurality of substations, means for connecting said operator station to said toll trunk, other means effective in response to operation of said first means for connecting said simplex circuit to said trunk through said windings, said differential relay remaining unoperated by current flow over said simplex circuit, digit pulsing means, means for connecting said digit pulsing means to said simplexed toll trunk, control means for causing said digit pulsing means to transmit pulses over said simplexed toll trunk, connecting means, said connecting means operated in response to the receipt of digit pulses transmitted over said simplex circuit by said pulsing means for connecting said toll trunk to one of said substations on an outgoing call, means for connecting a calling substation to said toll trunk during an incoming call, means for sending alternating current signals to said trunk on an incoming call, said alternating current operating said differential relay, a supervisory signal, said supervisory signal operated in response to operation of said differential relay to apprise the operator at said operator position of an incoming call.

16. In a telephone system, a plurality of substations, a toll operator station, means including a cord circuit for connecting said toll operator station to any one of said stations, a sleeve conductor in said cord circuit, a supervisory signal connected to said sleeve conductor, a manually operated device, a cord circuit marginal relay, a trunk associated with said connecting means having a low resistance ground sleeve circuit connected to said sleeve conductor, means operatively responsive to operation of said device for connecting said marginal relay over said conductor to said low resistance ground sleeve circuit, means including said marginal relay operated in response to said connection to said sleeve circuit for disconnecting said signal from said sleeve circuit, digit pulsing control means, means for connecting said digit pulsing control means to said sleeve circuit and said trunk, said digit pulsing control means operated in response to connection to said sleeve circuit for sending digit pulses over said trunk, transfer means operated during the pulsing period for releasing said cord circuit marginal relay and keeping said signal disconnected from said sleeve circuit and released after the pulsing period for reconnecting said cord circuit marginal relay to said sleeve circuit, said device again operated after pulse transmission, said marginal relay connecting means released for disconnecting said cord circuit marginal relay and reconnecting said signal to said sleeve circuit, a sleeve circuit marginal relay included in said sleeve circuit, and means operated in response to the reconnection of said signal to said sleeve circuit for said sleeve circuit marginal relay to prepare said signal for a ring-off operation upon termination of the call.

17. In a telephone system, an operator's position, a trunk line, means for connecting said position with said trunk line, a supervisory signal, a position relay, a trunk relay, a first circuit including said position relay and said supervisory signal connected in parallel and connected in series with said trunk relay and ground completed in response to the connection of said position with said trunk line for operating only said trunk relay, a low resistance ground circuit completed and connected to said first circuit in parallel with said trunk relay in response to the operation of said trunk relay for operating said position relay, means operated in response to the operation of said position relay for disconnecting said supervisory signal from said first circuit, operator controlled means for disconnecting said position relay from said first circuit and for connecting said supervisory signal to said first circuit, means included in said low resistance circuit operated responsive to the connection of said supervisory signal to said first circuit for disconnecting ground from said low resistance circuit, and means in said trunk line operative in response to the receipt of a disconnect signal for reclosing ground to said low resistance circuit to operate said supervisory signal.

18. In a telephone system, an operator's position, a trunk line, means for connecting said position with said trunk line, a supervisory signal, a position relay, a trunk relay, a first circuit including said position relay and said supervisory signal connected in parallel and connected in series with said trunk relay and ground means to complete said first circuit in response to the connection of said position with said trunk line means responsive to completion of said circuit for operating only said trunk relay, a low resistance ground circuit completed and connected to said first circuit in parallel with said trunk relay by the operation of said trunk relay for operating said position relay, keyed digit pulsing means, means for connecting said pulsing means to said ground circuit and disconnecting said first circuit, said pulsing means effective in response to connection to said low resistance ground circuit for transmitting keyed digit pulsing over said trunk, operator controlled means for disconnecting said position relay from said first circuit and for connecting said supervisiory signal to said first circuit upon termination of said digit pulsing, means included in said low resistance circuit operated responsive to the disconnection of said position relay, from said first circuit for disconnecting ground from said low resistance circuit, and means in said trunk line operative in response to the receipt of a disconnect signal for reclosing ground to said low resistance circuit to operate said supervisory signal.

19. In a telephone system, a toll operator's position including a digit key sender, a toll trunk, a supervisory sleeve circuit in said trunk initially having a high resistance to ground, a supervisory lamp at said position, means for connecting said position to said trunk and for connecting said lamp to said sleeve circuit, means for changing the resistance of said circuit from a high resistance ground connection to a low resistance ground connection, means responsive to said low resistance ground connection for causing said key sender to transmit impulses over said trunk, means for disconnecting said lamp from said circuit during said pulsing, means effective after termination of impulse transmission for reconnecting said lamp to said circuit and for disconnecting ground from said low resistance circuit to prevent the operation of said lamp, and means in said trunk operated in response to a disconnect signal for reconnecting ground to said circuit to operate said lamp.

20. A telephone system comprising an operator's station, a trunk circuit, a plurality of substations, means for connecting said trunk circuit to said substations, means responsive to an operation by an operator at said operator's station for connecting said operator's station to said trunk circuit, a supervisory signal at said operator's station, said signal effective when connected to a low resistance ground circuit, a first relay, a first low resistance ground circuit, means responsive to said operation for connecting the parallel combination of said signal and said first relay to said first low resistance ground circuit, said first relay thereupon operating to open the circuit to said signal and prevent said signal from operating during initiation of the call, a digit pulsing means in said operator's station, circuit means connected with said pulsing means for opening the circuit to said signal and said first relay to prevent their operation during pulsing, said parallel connection reestablished upon completion of said pulsing whereupon said first relay is again operated to prevent said signal from operating, a second relay, a second low resistance ground circuit, means for opening said parallel circuit to said first relay and for connecting said signal to said second low resistance ground circuit in series with said second relay upon completion of said pulsing, said second relay thereupon operating to open said second low resistance ground circuit and prevent said signal from operating during conversation, a third low resistance ground circuit, operation of said second relay effective to prepare said third low resistance ground circuit to be connected to said signal, means operated responsive to the receipt of a disconnect signal from the called substation for connecting said supervisory signal to said prepared circuit, said supervisory signal thereby operated to indicate that the call is completed.

21. A telephone system comprising an operator's station, a trunk circuit, means for connecting said operator's station to said trunk circuit, a plurality of substations, means for connecting said trunk circuit to said substations, a supervisory signal at said operator's station, said signal operative responsive to its connection to low resistance ground, a marginal relay, a high resistance ground circuit, circuit means associated with said first connecting means for connecting the parallel combination of said signal and said relay to said high resistance ground circuit, said signal and said relay prevented from operating by said high resistance, a first low resistance ground circuit, means responsive to the operation of said high resistance ground connecting means for connecting said parallel circuit to said low resistance ground circuit to thereby operate said relay, means responsive to operation of said relay for opening the circuit to said signal before it can operate thereby preventing operation of the signal during initiation of the call, digit pulsing means at said operator's station, manually controlled means at said operator's station for causing said digit pulsing means to transmit digit pulses over said trunk circuit and for opening the circuit to said signal thereby preventing its operation during pulsing, means for reestablishing said parallel connection upon completion of said pulsing whereupon said relay is again operated to prevent said signal from operating, a second relay, a second low resistance ground circuit, means for disconnecting said marginal relay, means responsive to said disconnect means for connecting said signal to said second low resistance ground circuit through said second relay, said second relay thereby operating to open the second low resistance ground circuit before the signal can operate, said signal thereby being prevented from operating during conversation, a third low resistance ground circuit, operation of said second relay effective to prepare said third low resistance ground circuit to be connected to said signal, ring off means, said ring off means effective in response to a disconnect signal from said called substation for connecting said signal to said prepared circuit, whereby said signal is operated to indicate to the operator the termination of the call.

References Cited in the file of this patent

UNITED STATES PATENTS

| | | |
|---|---|---|
| 1,578,809 | Currier et al. | Mar. 30, 1926 |
| 1,788,471 | Powell | Jan. 13, 1931 |
| 1,801,368 | Peterson et al. | Apr. 21, 1931 |
| 2,010,372 | Peterson | Aug. 6, 1935 |
| 2,516,814 | Voss | July 25, 1950 |
| 2,549,688 | Jones | Apr. 17, 1951 |